Oct. 10, 1944.  W. H. HINSCH  2,359,991

WATER TREATING PLANT

Filed June 12, 1940  7 Sheets-Sheet 1

Oct. 10, 1944.　　　　W. H. HINSCH　　　　2,359,991

WATER TREATING PLANT

Filed June 12, 1940　　　　7 Sheets-Sheet 6

Inventor
Walter H. Hinsch

Patented Oct. 10, 1944

2,359,991

UNITED STATES PATENT OFFICE 2,359,991

WATER TREATING PLANT

Walter H. Hinsch, Chicago, Ill., assignor to Dearborn Chemical Company, Chicago, Ill., a corporation of Illinois Application June 12, 1940, Serial No. 340,024

10 Claims. (Cl. 210—10)

This invention relates to improvements in water treating plants and it consists of the matters hereinafter described and more particularly pointed out in the appended claims.

The flow rate of water through a water main forming a part of a municipal or other water supply system is quite irregular and varies with the demand for water from the main and therefore the flow rate cannot be controlled by the user. In treating water supplied from such a main, to fit it for the intended purpose, as for instance, for use in a steam boiler, a problem is encountered in providing automatic means for feeding a reagent in proportion to the flow.

A water treating plant such as may be found in a railroad yard, for supplying treated water for locomotive boilers, is mentioned as an example wherein the problem above mentioned is difficult to solve. Such a plant includes an elevated wayside tank supplied with untreated water, say from a city main. When such a tank is supplied with water from the main at one period of a day, the flow rate may be quite high so as to take but a relatively short time to supply the necessary amount of water therefor as controlled by the float valve of said tank. However, at another period of the day, when the demand for water ahead of the tank is relatively high, the flow rate to the tank drops so that it takes a relatively long time to supply the necessary water for the tank.

The wayside tank may be so located in a railroad yard as to be disposed a considerable distance from the main from which it receives untreated water, as well as a considerable distance from the column employed in watering a locomotive tender and which column is usually located convenient to a certain track in the yard.

When the water carried by the main is of such character as to be unsatisfactory for locomotive boiler use, it must be treated chemically to make it satisfactory. However, due to the arrangement of tracks, roadway buildings, coal bins and the like in a railroad yard, it is not always possible to locate the apparatus which proportions the treating chemical, adjacent the main or the wayside tank. Therefore, the distance between the wayside tank and the proportioning apparatus varies in different installations, and in some instances the proportioning apparatus may be located at a considerable distance from the wayside tank as well as the water main.

One of the objects of the present invention is to provide a water treating plant which includes means for accurately proportioning the chemical treatment for the untreated water supplied to a reservoir, such as a wayside tank from a main or the like at varying and uncontrollable rates.

Another object of the invention is to provide a water treating plant capable of providing chemical treatment for a reservoir such as a wayside tank in a railroad yard, in direct proportion to the amount of water passing a meter or other volume determining means associated with a supply line leading from the main to the tank so as to meet, without manual adjustment, the varying conditions of the flow through the line to the tank.

A further object of the invention is to provide a plant for this purpose that requires no piping for untreated water between the main and the proportioning means of the plant and whereby the proportioning means may be located at a convenient place in a railroad yard, at a substantial distance from the main, and this without the expense of major pipe alterations or installations.

Again, it is an object of the invention to provide a plant for this purpose which is of simple construction, is automatic, accurate and efficient in operation notwithstanding that the untreated water is being supplied at varying and uncontrollable rates.

The above mentioned objects of the invention, as well as others, together with the advantages thereof will more fully appear as the specification proceeds.

In the drawings:

Figs. 7, 8 and 9 are diagrammatic views of a circuit embodied in the improved plant and its timer, and illustrate each condition thereof as it occurs in a cycle of operation of the plant and its timer, and wherein Fig. 7 shows the "at rest" or "timed out" condition of the plant, after the time period for which the timer is set has expired. When the plant is in this condition, the contacts of the meter are open or disengaged, the unused set of contacts of the timer is closed and the used sets of the timer are open or disengaged, the reset magnet of the timer is deenergized, the driving motor for the timer is stopped and the motor starter is open so that the driving motor for the chemical pump is stopped.

Fig. 8 shows the "reset" conditon of the timer as initiated by the momentary closing or engagement of the contacts of the meter. When the plant is in this condition, the contacts of the meter are momentarily closed or engaged, the reset magnet of the timer is energized and its clutch members are disengaged, the gearing of the timer is reset with the trip pinion thereof against its stop. At this time the driving motor of the timer is still stopped and the motor starter is still open so that the driving motor for the chemical pump remains stopped.

Fig. 9 shows the "running" or "timing" condition of the plant as initiated by the opening or disengagement of the contacts of the meter. When the plant is in this condition, the contacts of the meter are open or disengaged, the "reset" magnet of the timer is deenergized and its clutch members are again engaged, the two sets of contacts of the timer, which are used in the operation of the plant of this invention are closed or engaged, the driving motor of the timer is running and driving the gearing of the timer towards its trip position and the motor starter is closed so that the motor for the chemical pump is operating the same.

When the time interval for which the timer has been set has expired and one cycle of operation of the plant has been completed, the condition of the plant and its timer returns to that shown in Fig. 7, ready for another cycle of operation as initiated by the next succeeding momentary closing and then opening of the contacts of the meter.

Figure 1:
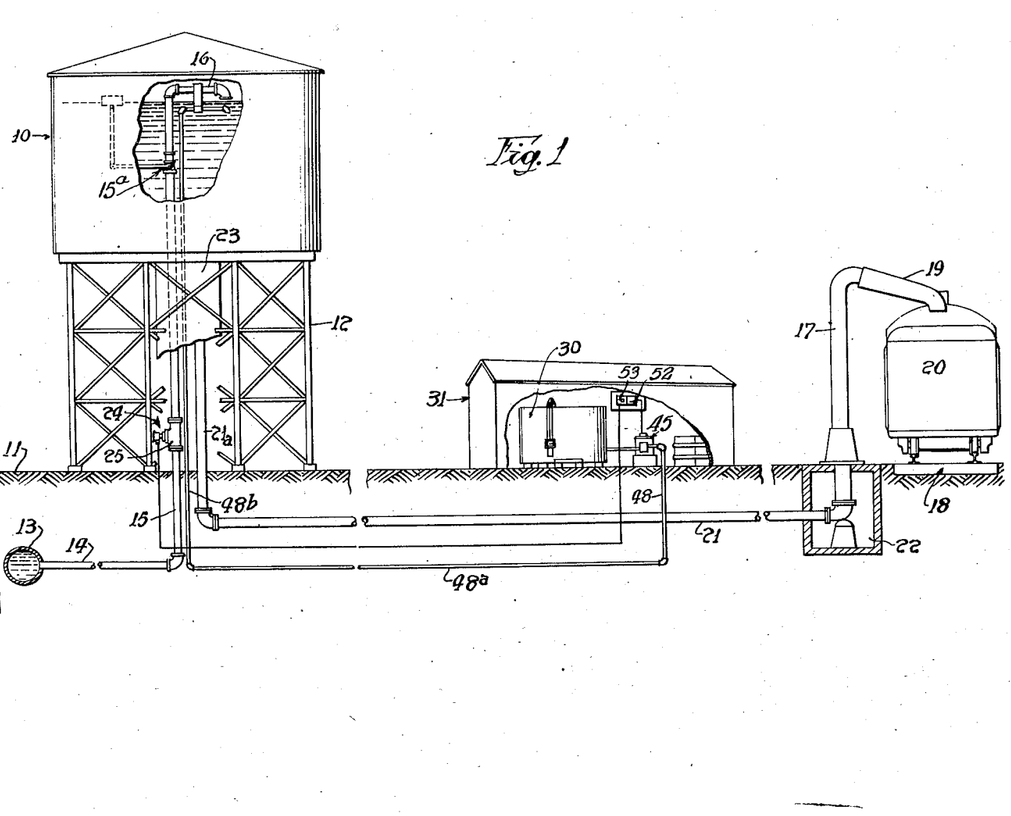
Fig. 1 is a view partly in elevation and partly in section illustrating the invention as embodied in a typical railroad water treating plant for supplying treated water to the tender of a locomotive boiler.

Referring now in detail to that embodiment of the invention illustrated in the accompanying drawings: 10 indicates a reservoir for holding water and which in the present instance in Fig. 1 is illustrated as a conventional wayside water tank. Such a tank is usually supported at a suitable elevation, above ground level 11 by the usual upright structural frame work 12. 13 indicates a water main usually located underground below the frost line. Such a main forms a part of a municipal water supply system and it is connected by piping to the tank 10. The main 13 is often located a considerable distance from the tank and a lateral underground pipe 14 leads off from the main to a position substantially beneath the tank where it has connected to it, a riser pipe 15.

Said riser pipe opens through the bottom of the tank 10, and extends up through the same to a point terminating near the top thereof in a lateral leg 16 to discharge untreated water into said tank at an elevation above the "full" water level of the tank. The flow of water through the riser pipe is controlled by a float valve 15a as appears in Fig. 1.

17 indicates a conventional water column usually disposed in a railroad yard adjacent one of the tracks 18 thereof. This column includes a spout 19 which may be swung from a clearance position relative to said track to one wherein it discharges water into the tender 20 of a steam locomotive stopped in a suitable position on said track. An underground pipe 21 has one end extended into a frost box or pit 22 where it is operatively connected to the bottom end of the column 17 also disposed in said frost box or pit. The other end of said pipe 21 terminates at a point beneath the tank 10 where it is connected to the bottom end of a down pipe 21a. The upper end of said down pipe extends through and into a position somewhat slightly above the bottom of the tank. Water in said tank flows through the pipes 21a—21 to the column 17 and out of the spout thereof under the head pressure of the water in the tank. It is to be understood that a suitable valve (not shown) is incorporated in the column which controls the flow of water from the tank to the column and this valve is actuated by one of the locomotive crew when it is necessary to "take on" water.

Figures 4, 5, 6:
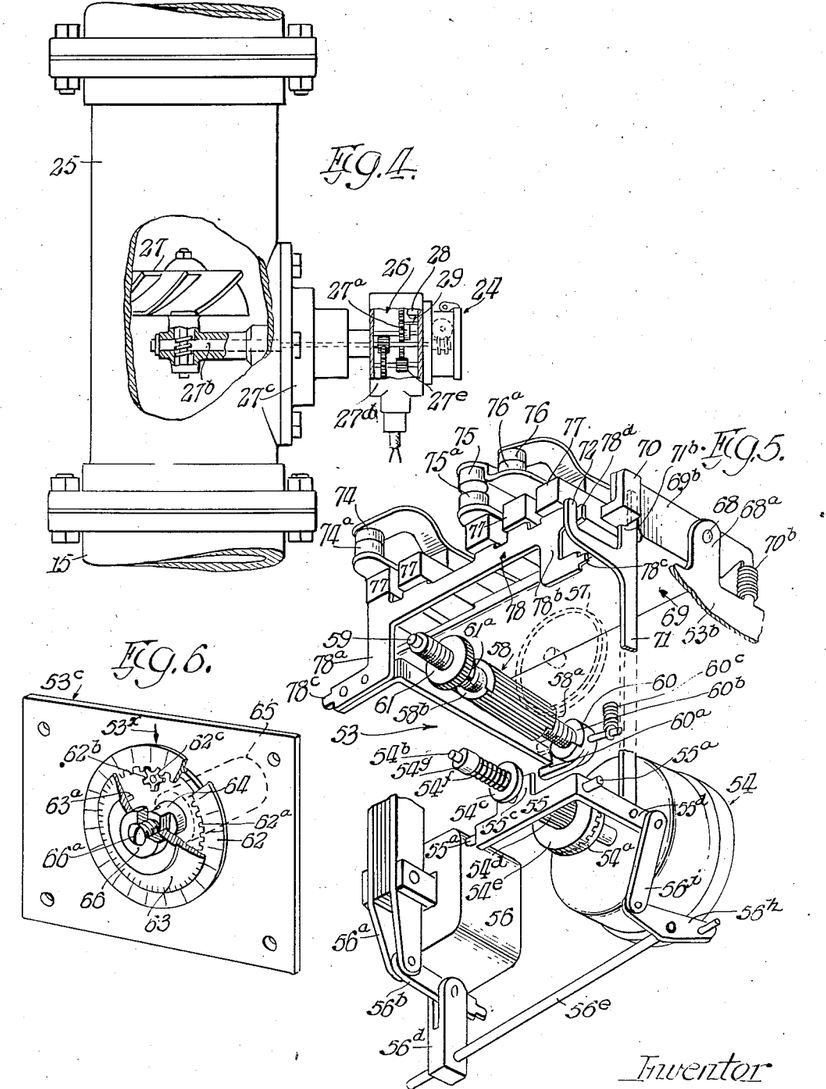
Fig. 4 is a view partly in elevation and partly in section of a meter incorporated in and for measuring the amount of water passing through a pipe which supplies untreated water to a reservoir or tank from a main.
Fig. 5 is a perspective diagrammatic view of certain operative parts of a variable cycle control timer employed in the improved water treating plant.
Fig. 6 is a perspective view of the face plate of the cycle control timer shown in Fig. 5 and illustrates more particularly the micrometer time adjustment dial thereof and later mentioned herein.

Those parts of the pipes 15 and 21a between the ground level 11 and bottom of the tank 10 are usually enclosed by a suitable insulated tubular protector or sheath 23. To measure the amount of water flowing from the main to the tank, a meter 24 is employed in connection with the riser pipe 15. As indicated in Fig. 1 and as shown in Fig. 4, this meter is carried by a flanged fitting 25 incorporated in the riser pipe 15 with the meter opening through the protector 23 at about eye level for easy reading.

The meter may be of any standard type and associated therewith is a normally open switch 26 (see Figs. 4 and 7) which closes once and then opens each time a predetermined number of gallons of untreated water has flowed through the riser pipe 15 into the tank. A meter which may be purchased in the open market under the trade name "Sparling" is well adapted for the purpose. Such a meter includes a propeller 27 disposed in the fitting 25 and facing upstream thereof. This propeller is driven in direct proportion to the rate at which water flows through the pipe 15. Said propeller drives a shaft 27b which extends through a suitable bearing 27c and into and through a gear case 27d to be directly connected to the mechanism of the meter 24 which "counts" the number of gallons of water that flows through the pipe 15. That part of the shaft 27b in gear case 27d drives a gear train 27e in said case, as best appears in Fig. 4. This gear train drives an eccentric or cam 27a which is the actuator for the switch 26 as a whole. The switch 26 includes a fixed contact 28 and a movable spring finger contact 29 normally out of engagement therewith, and disposed to ride upon the periphery of the eccentric or cam 27a. Therefor once each time a certain number of gallons of water has passed through the pipe 15, the cam 27a causes the contact 29 momentarily to engage the contact 28 and close a circuit therethrough and then to permit said contacts to open and break said circuit. Said contacts hold said circuit open until the meter again operates through the actuator 27a to close said switch the next time said certain number of gallons of water has flowed through the pipe 15.

To treat the water delivered to the column 17, a reagent in liquid form is mixed with the untreated water supplied to the tank 10 and the amount of such reagent is always in proportion to the amount of untreated water supplied to the tank 10. Therefore, the treated water "taken on" by a locomotive tender from the water column is always substantially uniform.

The liquid reagent is a solution of a water treating chemical and water and these are mixed together in a suitable tank and in which the solution is stored until required when it is then pumped from that tank into the wayside tank 10.

Figure 2:
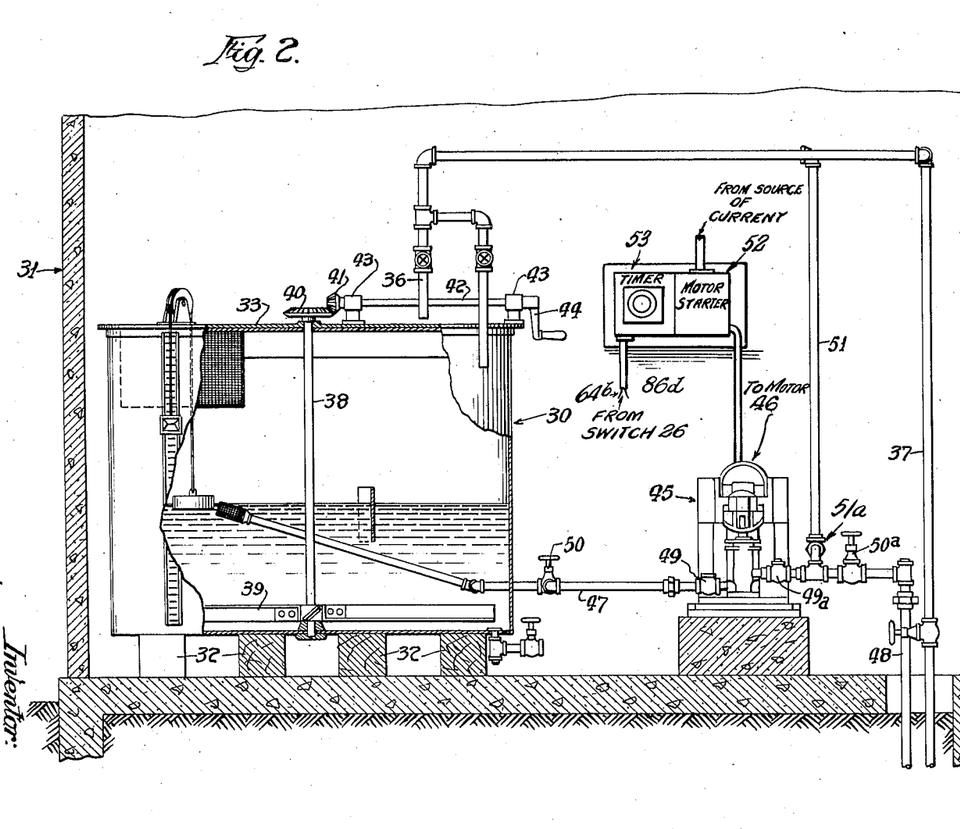
Fig. 2 is a view partly in side elevation and partly in vertical section of a tank apparatus for mixing water treating chemicals into a uniform solution, along with a pump, both of which are located in a pump house, and whereby the water treating solution is delivered to the water to be treated, as will later appear.
Figure 3:
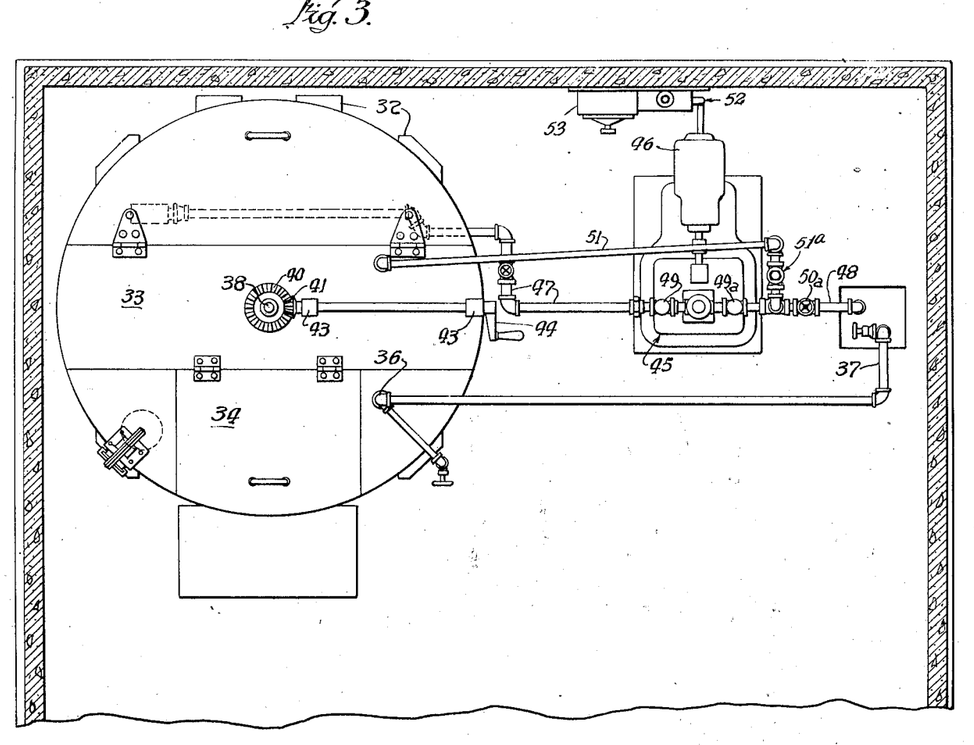
Fig. 3 is a plan view of the parts shown in Fig. 2.

The mixing tank just above referred to and which is indicated by the numeral 30 in Figs. 1, 2 and 3, is enclosed in a suitable pump house or building 31 which may be located at a place convenient therefor in the railroad yard. It is preferable that the pump house 31 be located adjacent the wayside tank 10, but if the presence of other equipment in the yard makes this impossible, it may be disposed at a considerable distance therefrom. In the particular installation shown in Fig. 1, said pump house is located between the tank 10 and the column 17.

The mixing tank 30 as shown in Figs. 2 and 3 is an upright cylindrical one and rests upon ties 32 placed upon the floor of the pump house. It has a closed top 33 in which is provided a hinged door 34 by which treating chemicals may be introduced into the tank. A valved pipe 36 forming part of a pipe line 37 leading from a water supply, is arranged to discharge water into the top of said tank.

The pump whereby the treating solution is transferred from the tank 30 to the tank 10, is preferably disposed as a unit with said tank 30 in the pump house 31, which may also serve as a storage space for the chemical used in making the treating solution in said tank 30. The pump house need not be very large and as before mentioned, its location in a railroad yard is dependent upon space in said yard convenient therefor, the distance which said building is located from the track 18 being of a secondary matter. In other words, this building may be located relatively close to the tank 10 in one railroad yard and may have to be located a considerable distance away from said tank in another railroad yard.

Axially of the tank is an upright shaft 38, the bottom end of which carries agitator blades 39. On the top end of said shaft is a bevel gear 40 with which a bevel pinion 41 on one end of a horizontal shaft 42 is engaged. This shaft is suitably journalled in bearings 43 on the tank top and its other end projects beyond the side of the tank and where it is provided with a crank 44 by which said agitator may be turned to agitate the chemical and water in the tank 30 to provide the liquid reagent.

Means are provided whereby the reagent in the tank 30 is pumped into the tank 10 for treating the water therein. This means comprises a pump 45 disposed in the pump house or building 31 and driven directly by a motor 46, as best appears in Fig. 3. Said motor is indicated as a three-phase motor in Figs. 7, 8 and 9. A valved pipe 47 connects the bottom portion of the tank 30 with the inlet side of the pump and a second pipe 48 leads off from the outlet or discharge side of the pump to tank 10. A horizontal part 48a of said pipe is disposed underground while an upright part 48b thereof is disposed in the sheath 23 before mentioned and passes through the bottom of the tank to discharge into the tank towards its top but below the high water level in the tank.

Suitable check valves 49—49a and shut-off valves 50—50a are disposed in the pipes 47—48. A by-pass pipe 51 is connected at one end to the pipe 48 between the valves 49a—50a and is so disposed at its other end as to discharge into the tank 30. This by-pass pipe has a safety valve 51a arranged therein. By suitable manipulation of the valves mentioned, when the pump 45 is running, treating reagent may be caused to flow through the pipes 48—48a and 48b to the tank 10 or to be circulated through the tank 30 and pump 45. The tank 30 and the pump 45 and its motor 46 constitute a unit and the operation of said motor is controlled by a motor starter 52 in connection with a cycle control timer 53. Said motor starter and said timer are suitably supported upon one of the walls of the pump house or building 31 as best appears in Figs. 2 and 3.

Figure 7:
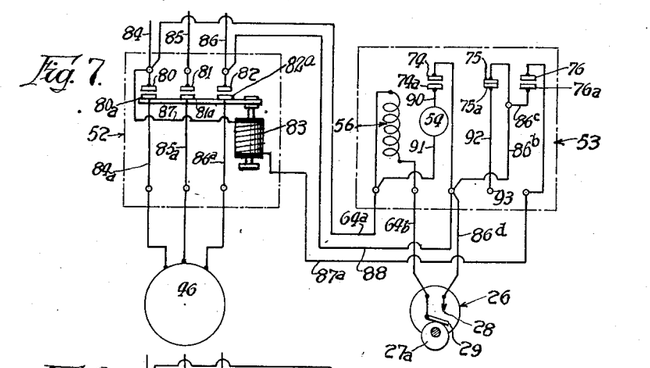

In Fig. 7 is shown a circuit for the control of the pump motor 46 and which circuit includes the motor starter 52, the cycle control timer 53 and the meter contacts 28—29. The motor starter 52 is a conventional type of starter and the cycle control timer is an instrument which may be purchased in the open market under the trade name of "Microflex." In general, the timer 53 consists of a contact operating mechanism driven through an electromagnetic clutch. It is entirely automatic in its action and requires only the closing and opening of the meter actuated contacts 28—29 to initiate a cycle of operation.

The construction of the timer best appears in Figs. 10 to 15 inclusive of the drawings, and in Fig. 5 which shows a perspective view of the main operating parts thereof with the upper parts separated from the lower parts for clarity in illustration.

Figure 11:
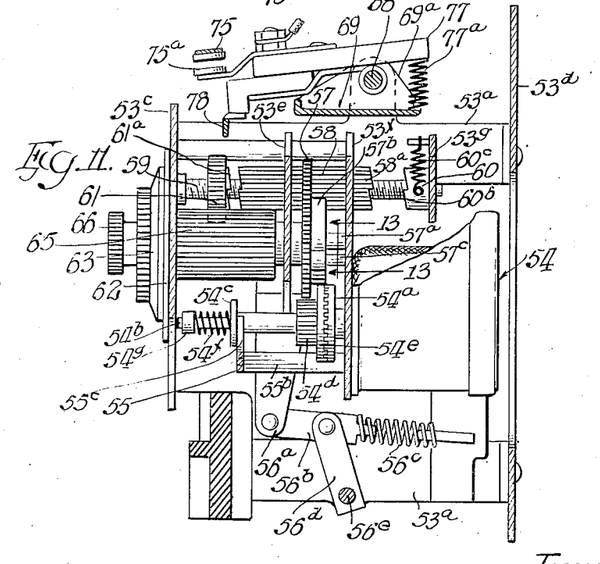
Fig. 11 is a vertical sectional view through the timer as taken on the line 11—11 of Fig. 10, with the face plate shown in Fig. 6, in the normal position with respect to other parts of the timer.
Figure 12:
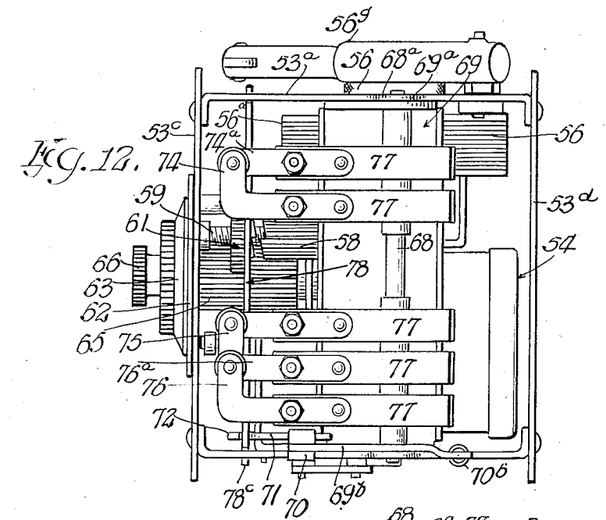
Fig. 12 is a top plan view of the parts of the timer appearing in Fig. 11.
Figure 13:
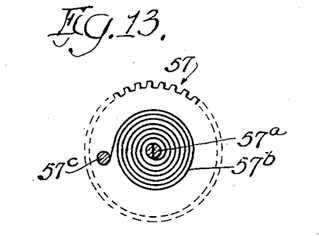
Fig. 13 is a detail vertical sectional view through a part of the timer as taken on the line 13—13 of Fig. 11.
Figure 14:
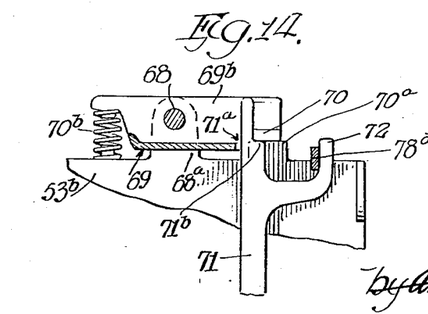
Fig. 14 is a vertical detail sectional view through a part of the timer as taken on the line 14—14 of Fig. 10.
Figure 15:
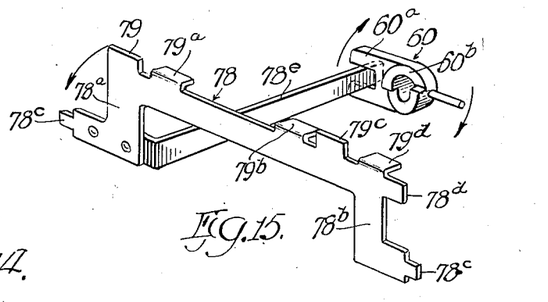
Fig. 15 is a perspective view of a certain rockable rack forming a part of timer, in association with means for rocking the same.

The timer includes left and right hand side plates 53a and 53b, front or face plate 53c and a rear plate 53d respectively, as well as intermediate plates 53e, 53f and 53g, which appear in Fig. 11, the latter being suitably supported in place from the front and rear plates.

54 indicates a small synchronous motor supported from the plate 53f, and which motor drives a clutch member 54a. A shaft 54b is arranged coaxially with the axis of the clutch element 54a and the front end of said shaft abuts against the face plate 53c as appears in Fig. 11.

Longitudinally movable on the shaft 54b is a sleeve provided with a collar 54c, a pinion or gear 54d and a clutch member 54e adapted to engage with and to be released from the clutch member 54a. A spring 54f is disposed on the shaft between the collar 54c and a collar 54g fixed to the front end of the shaft and which spring normally urges the clutch member 54e into engagement with the clutch member 54a and whereby the gear 54d is driven from the motor before mentioned.

55 indicates a rockable shifter yoke disposed below and transversely of the shaft 54b. Said yoke has end trunnions 55a. One of these trunnions bears in a horizontal bar 55b (see Fig. 11) projecting forwardly from the plate 53f and the other trunnion bears in the side plate 53b. The central part of this yoke is made as a fork 55c that engages behind the collar 54c and the right hand end of said yoke carries a rearwardly extending arm 55d which is connected up with suitable mechanism as later appears and whereby the yoke is rocked counterclockwise in Fig. 11 to release the clutch member 54e from the clutch member 54a.

An electromagnet 56 is disposed toward the left hand side of the timer and associated therewith is a top pivoted armature 56a. The bottom end of said armature is connected to the front end of a link 56b, the rear end of which is operatively engaged with a compression spring 56c as best appears in Fig. 11. The link 56b is operatively engaged with the top end of an arm 56d which is fixed at its bottom end to a transverse rock shaft 56e that is journalled at its ends in the side plates 53a and 53b respectively. The left hand end of said shaft, outside the side plate 53a is fixed to one end of an arm 56f, the other end of which is operatively engaged with a pivoted dashpot arrangement 56g. The right hand end of said shaft outside of the side plate 53b carries an arm 56h which is connected by a link 56i to the arm 55d of the yoke 55, as best appears in Fig. 5.

When the magnet 56 is energized, it attracts the armature and through the link 56b it not only compresses the spring 56c but it rocks the yoke 55 counterclockwise as shown in Fig. 11 so as to disconnect the clutch 54e from the clutch member 54a. When the magnet is deenergized the spring 56c expands and this through the arm 56d, shaft 56e, arm 56h and link 56g rocks the yoke clockwise so that the spring 54f causes the clutch member 54e to again engage the clutch member 54a so that the gear 54d may then be driven from the motor.

An idler gear 57 is journalled on a shaft 57a supported by the intermediate plates 53e and 53f respectively and this gear meshes with the gear 54d and a relatively long barrel-like tripping gear 58 that is mounted on a threaded shaft 59 extending from the front toward the rear of the casing and journalled at its ends in the front plate 53c and the intermediate plate 53g as best appears in Fig. 11.

A spiral spring 57b (see Fig. 13) is disposed to the rear of the gear 57 and one end is fixed to the shaft 57a while its other end is fixed to an anchorage pin 57c projecting forwardly from the intermediate plate 53f. When the gear 57 is driven in one direction by the gear 54d it winds up the spring 57b to store up energy therein to turn said gear in the other direction when the clutch member 54e is disengaged from the clutch member 54a as previously mentioned.

Loose on the rear or inner end of the shaft 59 is trip lever 60 which extends toward the left hand side of the timer and where it is bifurcated as at 60a. The front end of its sub is made as a clutch face 60b. A spring 60c is so arranged and connected to said lever as normally to swing it counterclockwise as viewed in Figs. 5 and 15 respectively and the purpose of said parts will appear later.

A stop member 61 in the form of a gear has threaded engagement on the front or outer end of the shaft 59 so that when it is rotated in one direction or the other, it will also move horizontally on the shaft in one direction or the other. The inner or rear face of said stop member is made as a clutch face 61a.

The ends of the long barrel-like tripping gear 58 are made as clutch faces 58a and 58b respectively operatively to engage the coacting clutch faces 60a and 61a on the trip lever 60 and on the stop member 61 respectively. When the gear 58 is driven in one direction by the idler gear 57, as before mentioned, said gear 58 moves endwise on the shaft 59 to engage the trip lever 60 and rock it in one direction against the action of the spring 60c and which spring is then tensioned. When the gear 58 is driven in the other direction by the gear 57 it will move endwise on the shaft in the other direction so that its clutch face 58b will engage the face 61a of the stop member 61 so as to be stopped thereby.

The front or face plate 53c of the timer has a calibrated dial ring 62 mounted on its front face for a turning movement as by an annular rib and groove arrangement shown in Fig. 6. The inner edge of said ring is formed with teeth 62a that mesh with the teeth of a small pinion 62b on a shaft 62c carried by the plate 53c. The dial ring 62 is disposed between the plate 53c and a dial 63 that is fixed to the front end of a shaft 64 that is journalled in and extends through and rearwardly of said plate. The inner or rear end of the shaft 64 to the rear of the front plate has a barrel gear 65 fixed thereto that meshes with the stop gear member 61. The gear 65 best appears in Fig. 11 although it is indicated in dotted lines in Fig. 6. When the dial 63 is turned in one direction or the other, the barrel gear 65 turns therewith. As the barrel gear meshes with the stop gear member 61, which has threaded engagement on the shaft 59 as before mentioned, said stop gear member 61 moves axially along the shaft 59 to adjust the longitudinal and angular position of its clutch face 61a relative to the associated clutch face 58b of the tripping gear 58.

On the inner face of the dial 63 is a tooth part 63a (see Fig. 6) which in one point of the turning of said dial will, as it passes the pinion 62b engage and turn the same the angular distance of one tooth. This, of course, will turn the dial ring 62 the angular distance of one tooth so that said ring provides a micrometric reading in connection with an indicator arrow 53x on the plate 53c for fine adjustment. The dial 63 is secured to the shaft 64 by a nut 66, and a screw 66a prevents the nut 66 from being released from said shaft.

With the mechanism described, when the pinion 54d is driving the idler gear 57, said gear is winding up the spring 57b to store up power or energy therein while it is driving the trip gear member 58. It is obvious that the angle through which the member 58 may be driven by the gear 57 and the amount of longitudinal movement of said member 58 on the shaft 59, before the trip lever 60 functions for its intended purpose, may be accurately adjusted. The greater the angle, the longer the time it takes for the trip lever to function, as will soon appear and conversely, the lesser the angle, the shorter time it will take for the trip lever to function. By turning the dial 63 in one direction or the other, it is apparent that the distance between the clutch face 61a of the stop member 61 and the clutch face 60b of the trip lever 60 may be adjusted and it is this distance that determines the distance the trip gear member 58 travels back and forth on the shaft 59.

By reason of the engagement of the stop member 61 with the barrel gear 65, the stop member cannot rotate to travel toward the plate 53c when the clutch face 58b of the member 58 engages the clutch face 61a in the movement of said member 58 forwardly or to the left, along the shaft 59 when viewed as in Figs. 5 and 11.

68 indicates a cross shaft disposed above and extending between and journalled in upright ears 68a rising from the top edges of the side plates 53a and 53b. A cradle 69 is disposed between said ears 68a. Said cradle has upright end walls 69a—69b that are journalled on the shaft 68 near the ears 68a and whereby the cradle may have a limited rocking action. The front end of the end wall 69b carries a block 70 that is adapted to engage upon a stop 70a (see Fig. 14) rising from the top edge of the side plate 53b. The rear end of the end wall 69b engages with a compression spring 70b which normally rocks the cradle counterclockwise when viewed in Fig. 5 and clockwise in Fig. 14 until it is stopped by reason of the engagement of the block 70 with the stop 70a.

To rock the cradle in opposition to the spring 70b, there is provided an upright link 71, the bottom end of which is pivotally connected to the arm 55d of the yoke 55, as best appears in Fig. 5. The upper end of said link extends through an opening 71a in the bottom of the cradle near the block 70 and said end of the link is formed with a shoulder 71b that engages under and is normally engaged with the bottom of the block 70. The upper portion of said link is provided with a forwardly and then upwardly extending arm 72, the purpose of which will later appear. Thus when the magnet 56 is energized to actuate the yoke 55 to separate the clutch member 54e from the clutch member 54a, the arm 55d will impart an upward lift to the link 71. Because of the engagement of the shoulder 71b of said link with the block 70 of the front end of the end wall 69b of the cradle 69, the cradle is caused to rock clockwise when viewed as in Fig. 5 and counterclockwise in Fig. 14 and will cause compression of the spring 70b. When said magnet is deenergized, the spring 70b will rock the cradle in an opposite direction until the block 70 engages the stop 70a before mentioned.

The timer also includes at least three sets of upper and lower contacts 74—74a, 75—75a, and 76—76a respectively, the contacts being so mounted, as will later appear, as to be relatively movable into and out of operative engagement with each other. So far as the present invention is concerned, use is made only of the sets of contacts 74—74a and 76—76a respectively. The contacts 75—75a of the other set are present in the timer as a whole when purchased in the open market and are for use in connection with apparatus quite different from that described herein. Therefore, although said contacts 75—75a appear in the drawings, they may be disregarded and will not be further mentioned because, as before stated, they have no function in connection with the apparatus described herein.

Each contact is carried by the front end portion of a bar of insulation 77, each of which is mounted, toward its rear end, for an independent rocking movement on the shaft 68 before mentioned. Between the rear margin of the cradle 69 and the rear end of each bar 77 is a light coiled spring 77a (see Fig. 11), the purpose of which is to yieldingly depress the contact carrying front end of each bar so that said bars will be capable of a limited rocking movement on said shaft.

The front ends of the bars 77 carrying the sets of contacts 74—74a, 75—75a and 76—76a before mentioned, overhang the top edge of a rack 78 that includes depending side arms 78a and 78b respectively. Each side arm has a lateral extension that terminates in a trunnion 78c and these trunnions engage in suitable openings in the side plates 53a—53b respectively so that said rack, which stands generally in an upright position, is capable of being rocked forwardly and rearwardly. At the top end of the arm 78b is an extension 78d, which is disposed behind the arm 72 of the link 71 and engages said arm, which then forms a stop for the forward swinging movement of the rack as a whole. Fixed at its front end to and extending rearwardly from the bottom end of the arm 78a of said rack is a lever 78e, the rear end of which operatively engages in the bifurcated arm 60a of the trip lever 60. When the trip lever is swung in the direction of the arrows shown in Fig. 15, it will, through the lever 78e cause the rack 78 to swing forwardly about its trunnion 78c until stopped by the engagement of the extension 78d with the link arm 72 as best appears in Figs. 5 and 15.

The top edge of the rack is formed to provide a plurality of stop shoulders 79—79a—79b—79c and 79d (see Fig. 15) respectively, one associated with and disposed in line with the bars 77 for the contacts before mentioned. The shoulders 79 and 79c are the highest, and the shoulders 79a, 79b and 79d are lower and extend rearwardly, as best appears in said Fig. 15.

Figure 8:
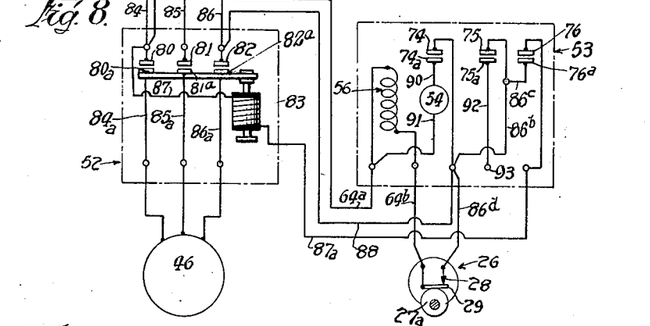
Figure 9:
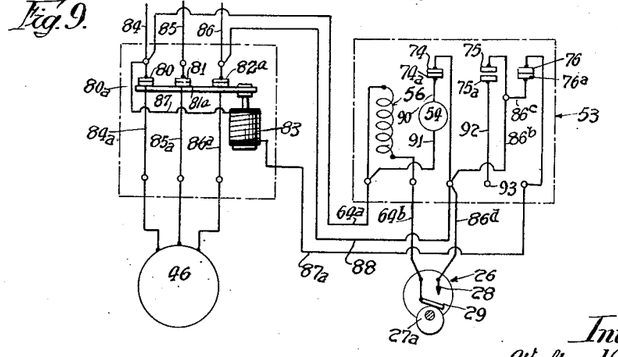

The motor starter 52, which best appears diagrammatically in Figs. 7, 8 and 9, includes sets of normally open contacts 80—80a, 81—81a, and 82—82a, one contact in each set being movable into and out of engagement with the other contact of the set. Movement is imparted to the movable contacts of said sets into engagement with the fixed contacts of said sets by means of an electromagnet 83. Alternating current supply lines 84, 85 and 86 lead to the contacts 80—81 and 82 and conductors 84a—85a and 86a connect the contacts 80a—81a and 82a to the motor 46 which, as before mentioned, is a three-phase motor. One side of the coil of the magnet 83 is connected to the line 84 by a conductor 87 while the other side of said coil is connected to the contact 76 of the timer 53 by conductor 87a.

The line 84 is connected by a conductor 64a to one side of the coil of the magnet 56 and the other side of this coil is connected by a conductor 64b with the movable contact 29 of the switch 26. The line 86 is connected by a conductor 88 with the contact 74 of the timer 53 and by branch conductors 86b and 86c to the contacts 75 and 76a respectively. The conductor 88 is connected by a branch conductor 86d to the fixed contact 28 of the meter switch 26. The motor 54 of the timer 53 has one side connected to the contact 74a by a conductor 90 and has its other side connected to the conductor 64a by a conductor 91. The contact 75a is connected by a conductor 92 to a terminal 93, which is not used.

After a cycle of operation of the plant as a whole, the parts of the motor starter 52 and timer 53 assume the position shown diagrammatically in Fig. 7. In this position, which is called the "at rest" or "timed out" condition of the timer, the contacts 74—74a are normally separated and so are the contacts 76—76a while the contacts 75—75a are engaged. However, as before mentioned, these contacts 75—75a do not function so far as the apparatus herein described is concerned. In this condition, the actuator 27a of the meter switch is so disposed that the contacts 28 and 29 thereof are disengaged so that the magnet 56 is deenergized. Likewise, as the contacts 74—74a are open, the motor 54 is deenergized. At this time, however, the clutch element 54e is engaged with the clutch element 54a and the associated contacts 80—80a, 81—81a and 82—82a of the motor starter 52 are all open or disengaged so that the motor 46 is deenergized and the pump 45 is idle. As the teeth 58a of the barrel gear 58 are still engaged with the teeth 60b of the trip lever 60, the spring 60c remains in tension.

Assume that untreated water is flowing from the main 13 through the pipe 14 and up the riser pipe 15 into the tank 10. As this water flows through the flanged fitting 25 in the riser pipe it will actuate the meter 24. Each time a predetermined number of gallons of water has passed through the meter, the actuator 27a causes the movable contact 29 of the meter switch to momentarily engage the fixed contact 28 thereof and then disengage therefrom.

When the meter contacts 29—28 are momentarily engaged, as shown in Fig. 8, the only thing that happens is that a circuit is established to energize the electromagnet 56. When said magnet is energized, it will, through its armature 56a, link 56b, arm 56d, shaft 56e, arm 56h and link 56i, rock, the yoke 55 to swing about its trunnions 55a counterclockwise when viewed in Figs. 5 and 11, against the action of the spring 56c. This rocking movement of the yoke, through the collar 54c will cause the clutch element 54e to disengage from the clutch element 54a.

At this time the energy stored up in the spring 57b is released because of the disconnection of the clutch member 54e from the motor 54. Said spring then drives the gear 57, which in turn so drives the barrel gear 58 as to move the same outwardly or forwardly on its shaft 59 until its clutch teeth 58b engage the like teeth 61a on the member 61. As the member 61 is in mesh with the barrel gear 65, carried by the face plate 53c as before mentioned, this engagement of said clutch teeth will stop further movement of the member 58 for reasons before explained. Simultaneously with the movement of the parts just above described, as the bottom end of the link 71 is connected to the yoke arm 55d, said link will, by reason of the engagement of its top end shoulder 71b (see Fig. 14) with the block member 70 on the cradle end wall 69b, rock the cradle clockwise (when viewed as in Figs. 5 and 11 and counterclockwise when viewed as in Fig. 14) so that its forward edge lifts the contact bars 77 as a group into a plane above the top edges of the rack 78 so that the contacts 74—74a and 76—76a are still open and the motors 54 and 46 are still deenergized. In the operation of the parts just before mentioned the spring 60c, which heretofore was held in tension because of the clutched engagement between the gear 58 and member 60, is released when said gear backs away from said member under the action of the released spring 57b. When said spring 60c has been released, it contracts and through the member 60 and lever arm 78e causes the rack 78 to swing rearwardly or clockwise in Fig. 5 about its trunnion 78c.

The operation of the parts above mentioned occurs when the meter contacts 28 and 29 are momentarily closed. As soon as said contacts separate or are open, the magnet 56 is deenergized and the armature 56a is released and spring 56c tends to expand and return the armature 56a to its normal position. Through the shaft 56e and linkage, before mentioned, the yoke 55 is rocked clockwise so that the clutch member 54e is again engaged with the clutch member 54a. When the yoke is rocked clockwise the link 71, which is connected to the yoke arm 55d is pulled downwardly so that the shoulder 71b on said link moves out of supporting engagement with the block 70 on the cradle 69 which is then rocked counterclockwise (in Fig. 5) under the action of the spring 70b. In the rocking movement of the cradle, the bars 77 will rock therewith. However, upon engagement of certain of the contacts, carried by said bars, with their associated stop shoulders on the rack 78, said bars may rock relatively on the shaft 68 to accommodate the different formations of said shoulders so that the contacts of associated pairs, as carried by certain of said bars, will engage or disengage from each other.

Figure 10:
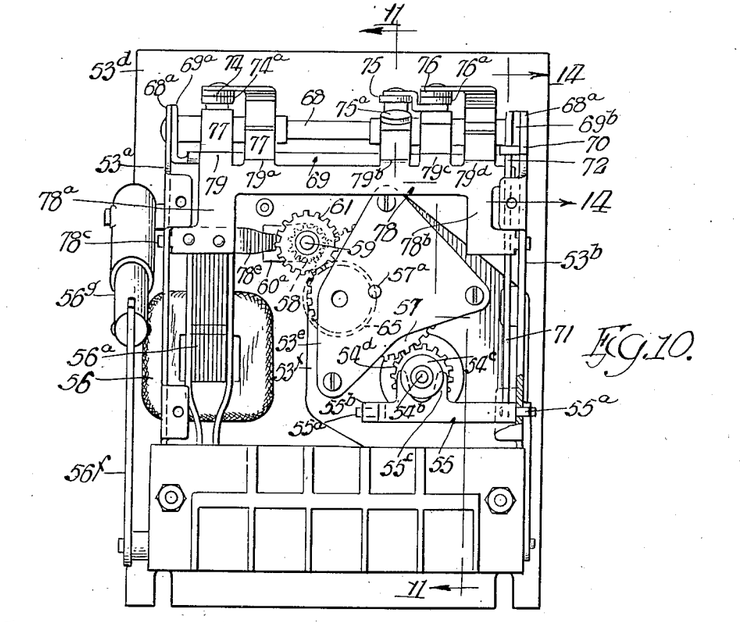
Fig. 10 is a view in front elevation of a variable cycle control timer appearing more or less in schematic perspective in Fig. 5, when the front or face plate of the timer, such as appears in Fig. 6, has been removed therefrom.

When the cradle 69 is rocked as above mentioned the bars 77 carrying the contacts 74a—75a and 76a will rock independently on the shaft 68 so that said contacts will engage and rest upon their associated lugs 79—79b and 79c respectively. In this movement of the bars, due to the formation of the lugs 79a and 79b the bars carrying contacts 74 and 76, will not be supported thereby so that said contacts 74 and 76 will move relatively to and will engage their associated contacts 74a and 76a (as shown in Figs. 5, 9 and 10). The engagement of the contacts 74 and 74a energizes the motor 54 and the engagement of the contacts 76 and 76a energizes the motor starter 52. This is the running or timing position for the entire timer 53 and corresponds to the conditions shown in Fig. 9. As the motor 54 is now energized and the clutch members 54a and 54e are now engaged, the pinion 54d drives the gear 57 and again winds up the spring 57b. When the gear 57 is thus being driven, it drives the member 58 so that it rotates clockwise in Fig. 5 and travels rearwardly on its shaft 59 until its clutch teeth 58c engage the clutch teeth 60b of the member 60 and rocks the same clockwise and again places the spring 60c under tension. Also at this time the bifurcated end of the member 60, through the lever 78e will swing the rack 78 counterclockwise, as shown by arrows in Fig. 15. This will dispose the rack 78 just forwardly of the ends of the bars 77 so that the bars 77 that carry the contacts 74a and 76a drop to engage and rest upon the front edge of the cradle 69. The contact bars 77 that carry the contacts 74 and 76 engage upon their associated lugs 79a and 79d so that they are supported in a position holding their contacts 74 and 76 out of engagement with the contacts 74a and 76a. As before stated the contacts 75 and 75a are not used and therefore it is not believed necessary to describe their movement.

When the contacts 74 and 74a are thus disengaged, this deenergizes the motor 54 and when the contacts 76 and 76a are thus disengaged, this deenergizes the motor starter 52. At this time the timer is in timed out or at rest position so that the entire plant is passive or is at rest. By turning the dial 63 in one direction or the other, it is possible to vary the length of time that the pump 45 operates in each cycle of operation and this controls the amount of reagent introduced into the untreated water.

After a cycle of operation, the apparatus will remain passive until a predetermined number of gallons of untreated water has passed through the meter into the tank 10 so that the meter switch 26 will again close and open the contacts 28—29 to initiate another cycle of operation for the apparatus. Thus, even though the rate of flow of untreated water from the main to the wayside tank be a varying one, which cannot be controlled by the user of the treated water, accurate and uniform treatment for said water is assured.

From the above it is apparent with the plant described, the feed of the treating reagent is in direct proportion to the volume of water passing through the pipe 15 and the amount of reagent may be changed to adjust the proportion between reagent and the untreated water when so desired.

While in describing the invention I have referred in detail to the form, arrangement, construction and relative location of the parts employed, when the same is involved in a railroad water treating plant, the same is to be considered only in an illustrative sense because the same principles of the invention may be embodied in plants for treating water for other purposes. Therefore, I do not wish to be limited to the plant shown and described except as may be specifically set forth in the appended claims.

I claim as my invention:

1. Water treating means embodying therein a pipe for the passage of untreated water therethrough, means for measuring the volume of water passing through said pipe, a supply of reagent, means for delivering reagent from said supply to the untreated water, electrically operable means, connected to said reagent delivering means and operative when energized to actuate the same, a circuit for said electrically operable means, a timer capable of cycles of operation and including mechanism for closing and opening said circuit, said timer also including an electrical device which when energized actuates said mechanism to initiate a cycle of operation of said timer and further including manually operable means for adjusting said mechanism so as to vary the length of time said circuit remains closed and is then opened and the length of time said electrically operable means is energized and then deenergized, a control circuit for said electrical device, and a switch in said control circuit and operable by said measuring means for energizing said electrical device so as to initiate a cycle of operation for said timer.

2. Water treating means embodying therein a pipe for the passage of untreated water therethrough, means for measuring the volume of water passing through said pipe, a supply of reagent, means connected to said reagent supply and including a motor which when energized causes said means to deliver reagent from said supply to the untreated water, a circuit for said motor, a timer capable of cycles of operation and including mechanism for closing and opening said circuit, said timer also including an electrical device which when energized actuates said mechanism to initiate a cycle of operation for said timer and further including manually operable means for adjusting said mechanism so as to vary the length of time said circuit remains closed and is then opened and the length of time said motor is energized and then deenergized, a control circuit for said electrical device, and a switch in said control circuit and operable by said measuring means for energizing said electrical device so as to initiate a cycle of operation for said timer.

3. A water treating means embodying therein a pipe for passage of untreated water therethrough, a switch, means operatively connected to said switch for opening and closing the same each time a predetermined volume of untreated water passes through said pipe, means providing a supply of reagent, a conduit leading from said supply and adapted to discharge reagent into the untreated water, a pump in said conduit, a motor for driving said pump, a circuit for said motor, a timer capable of cycles of operation and including mechanism for closing and opening said circuit, said timer also including an electrical device which when energized, actuates said mechanism to initiate a cycle of operation of said timer and further including manually operable means for adjusting said mechanism to vary the length of time said circuit remains closed and is then opened and the length of time said motor is energized and then deenergized, and a control circuit for said timer and in which said switch is disposed for energizing said electrical device so as to initiate a cycle of operation for the timer.

4. A water treating plant embodying therein water holding means, means for supplying untreated water to said holding means, means for metering the untreated water supplied to said holding means, a supply of reagent, means for delivering reagent from said supply to said untreated water after it has passed said metering means, electrically operable means connected to said reagent delivering means and operative when energized to actuate the same, a circuit for said electrically operable means, a timer capable of cycles of operation and including mechanism for closing and opening said circuit, said timer also including an electrical device which when energized actuates said mechanism to initiate a cycle of operation for said timer and further including manually operable means for adjusting said mechanism so as to vary the length of time said circuit remains closed and is then opened and the length of time said electrically operable means is energized and then deenergized, a control circuit for said electrical device, and a switch in said control circuit and operated by said metering means for energizing said electrical device so as to initiate a cycle of operation for said timer.

5. A water treating plant embodying therein water holding means, means for supplying untreated water to said holding means, means for metering the untreated water supplied to said holding means, a supply of reagent, means connected to said supply of reagent and including a motor for delivering reagent from said supply to the untreated water after it has passed said metering means, a circuit for said motor, a timer capable of cycles of operation and including mechanism for opening and closing said circuit, said timer also including an electrical device which when energized actuates said mechanism to initiate a cycle of operation of said timer and further including manually operable means for adjusting said mechanism so as to vary the length of time said circuit remains closed and is then opened and the length of time said motor is energized and then deenergized, a control circuit for said electrical device and including a switch operated by said metering means for energizing said electrical device so as to initiate a cycle of operation for said timer.

6. A water treating plant embodying therein, in combination with a main through which untreated water flows at variable rates, means for holding untreated water, a pipe leading from said main to said water holding means, a meter in said pipe, a switch actuated by said meter and adapted to close and then open each time a predetermined number of gallons of water has flowed through said pipe, a supply of reagent, means for delivering reagent from said supply to said untreated water after it has passed through the meter, electrically operable means connected to said reagent delivering means and operative when energized to actuate the same, a circuit for said electrically operable means, a timer capable of cycles of operation and including mechanism for closing and opening said circuit, said timer also including an electrical device which when energized actuates said mechanism to initiate a cycle of operation of said timer and further including manually operable means for adjusting said mechanism so as to vary the length of time said circuit remains closed and is then opened and the time said electrically operable means is energized and then deenergized, and a control circuit for said electrical device and in which said switch is disposed for initiating a cycle of operation for said timer, each time a predetermined number of gallons of water has passed the meter.

7. A water treating plant embodying therein water holding means, means for supplying untreated water to said holding means, means for metering the untreated water supplied to said holding means, a supply of fluid reagent, a pump connected to said supply for delivering fluid reagent to said untreated water after it has passed said metering means, a motor for driving said pump, a circuit for said motor, a timer capable of cycles of operation and including mechanism for closing and opening said circuit, said timer also including an electrical device which when energized actuates said mechanism to initiate a cycle of operation for said timer and further including manually operable means for adjusting said mechanism so as to vary the length of time said motor is energized and then deenergized, a control circuit for said electrical device, and a switch in said control circuit and operable by said metering means for energizing said electrical device so as to initiate a cycle of operation for the timer.

8. A water treating plant embodying therein, in combination with a main through which untreated water flows at variable rates, means for holding untreated water, a pipe leading from said main to said water holding means, a meter in said pipe, a switch associated with said meter and adapted to close and then to open each time a predetermined number of gallons of untreated water has flowed through said pipe, means providing a supply of fluid reagent, means connecting said reagent supply with said holding means and including a pump, a motor for driving the pump, a circuit for said motor, a timer capable of cycles of operation and including mechanism for closing and opening said circuit, said timer also including an electrical device which when energized actuates said mechanism to initiate a cycle of operation for said timer and further including manually operable means for adjusting said mechanism so as to vary the length of time said circuit remains closed and is then opened and the length of time said motor is energized and then deenergized, a control circuit for said electrical device and in which said switch is disposed and actuated by said meter for energizing said electrical devices so as to initiate a cycle of operation for the timer.

9. A water treating plant embodying therein, in combination with an underground water main through which untreated water flows at varying rates, a wayside water tank, a pipe connecting said main and said tank for delivering untreated water to said tank, a meter in said pipe, a second tank for holding a supply of fluid reagent located a distance from said main and said wayside tank, a second pipe for connecting said reagent supply tank and said wayside tank, a pump associated with said second pipe for pumping reagent therethrough into said wayside tank, a motor for driving said pump, a circuit for said motor, a timer capable of cycles of operation and including mechanism for closing and opening said circuit, said timer also including an electrical device which when energized actuates said mechanism to initiate a cycle of operation of said timer and further including manually operable means for adjusting said mechanism so as to vary the length of time said circuit remains closed and is then opened and the length of time said motor is energized to drive said pump and is then deenergized, a control circuit for said electrical device and a switch in said control circuit and operable by said meter for energizing said electrical device so as to initiate a cycle of operation of the timer.

10. Water treating means embodying therein a pipe for the passage of untreated water therethrough, means for measuring the volume of water passing through said pipe, a supply of reagent, means for delivering reagent from said supply to the untreated water, electrically operable means connected to said reagent delivery means which in an energized condition thereof actuates said reagent delivering means, a circuit for said electrically operable means, a timer capable of cycles of operation and including mechanism for so controlling said circuit as to produce a closed condition and then an open condition therefor, said timer also including an electrical device capable of having an energized and a deenergized condition respectively and when in one of said conditions, actuating said mechanism to initiate a cycle of operation of said timer, said timer further including manually operable means for adjusting said mechanism to vary the length of time said circuit remains in one condition and is then changed to and remains in another condition and the length of time said electrically operable means remains in its operating condition and in its non-operating condition respectively, a control circuit for said electrical device and a switch in said control circuit and operable by said measuring means for so producing that condition thereof that said electrical device initiates a cycle of operation for said timer.

WALTER H. HINSCH.